(12) United States Patent
Saeki (10) Patent No.: US 8,417,430 B2
(45) Date of Patent: Apr. 9, 2013

(54) FOLLOWING DISTANCE CONTROL DEVICE AND FOLLOWING DISTANCE CONTROL METHOD

(75) Inventor: Minoru Saeki, Seto (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 12/602,775

(22) PCT Filed: Jun. 3, 2008

(86) PCT No.: PCT/IB2008/001415
§ 371 (c)(1),
(2), (4) Date: Dec. 3, 2009

(87) PCT Pub. No.: WO2008/149199
PCT Pub. Date: Dec. 11, 2008

(65) Prior Publication Data
US 2010/0204870 A1 Aug. 12, 2010

(30) Foreign Application Priority Data
Jun. 4, 2007 (JP) .................................. 2007-148189

(51) Int. Cl.
*B60T 7/12* (2006.01)
*G05D 1/00* (2006.01)
*G06F 1/00* (2006.01)

(52) U.S. Cl. ............ 701/96; 701/31.4; 701/117; 701/45

(58) Field of Classification Search .................... 701/96, 701/31.4, 93, 37, 22, 1, 38, 101, 51, 110, 701/108; 477/80; 123/399, 352; 700/289
See application file for complete search history.

(56) References Cited

U.S. PATENT DOCUMENTS

| | | | | |
|---|---|---|---|---|
| 5,166,881 A * | 11/1992 | Akasu | | 701/96 |
| 6,768,937 B2 * | 7/2004 | Andreas et al. | | 701/96 |
| 6,820,709 B1 | 11/2004 | Zimmermann et al. | | |
| 6,876,915 B2 * | 4/2005 | Kuramochi et al. | | 701/96 |
| 8,010,274 B2 * | 8/2011 | Sawada | | 701/96 |
| 8,060,289 B2 * | 11/2011 | Takae et al. | | 701/96 |
| 2003/0014175 A1 | 1/2003 | Andreas et al. | | |
| 2005/0149247 A1 * | 7/2005 | Kuramochi et al. | | 701/96 |
| 2009/0005948 A1 * | 1/2009 | Ibrahim et al. | | 701/96 |
| 2010/0204870 A1 * | 8/2010 | Saeki | | 701/29 |

FOREIGN PATENT DOCUMENTS

| | | |
|---|---|---|
| DE | 41 00 993 | 7/1991 |
| DE | 100 47 048 | 4/2002 |
| DE | 102 05 971 | 11/2002 |
| JP | 2001 39182 | 2/2001 |

(Continued)

*Primary Examiner* — Thomas Black
*Assistant Examiner* — Robert Payne
(74) *Attorney, Agent, or Firm* — Oblon, Spivak, McClelland, Maier & Neustadt, L.L.P.

(57) ABSTRACT

A following distance control device includes a vehicle speed detecting device that detects the vehicle speed VSPD of an own vehicle and outputs a vehicle speed equal to or less than a predetermined speed as zero, a following distance detecting device that detects a following distance between a preceding vehicle and the own vehicle, a first requested acceleration computing device that computes a requested acceleration GBASE from the vehicle speed and the following distance, and a stop determining device that determines the stop of the own vehicle, on the basis of a requested acceleration Greq_pre_0 kph at a time point when the output value of the vehicle speed detecting device becomes zero.

9 Claims, 4 Drawing Sheets

FOREIGN PATENT DOCUMENTS

| | | |
|---|---|---|
| JP | 2001 225669 | 8/2001 |
| JP | 3644777 | 5/2005 |
| WO | 01 40011 | 6/2001 |
| WO | 01 85486 | 11/2001 |

* cited by examiner

VSPD: DETECTED VEHICLE SPEED
GSTOP: REQUESTED ACCELERATION FOR STOPPING
TSTOP: TIME REQUIRED UNTIL STOP DETERMINATION
GBASE: BASE REQUESTED ACCELERATION
Greq_pre_0kph: REQUESTED ACCELERATION AT TIME POINT WHEN DETECTED VEHICLE SPEED BECOMES ZERO
Vpre_0kph: REAL VEHICLE SPEED AT TIME POINT WHEN DETECTED VEHICLE SPEED BECOMES ZERO

FIG. 3

FOLLOWING DISTANCE CONTROL DEVICE AND FOLLOWING DISTANCE CONTROL METHOD

BACKGROUND OF THE INVENTION

1. Field of the Invention

The present invention relates to a following distance control device and a following distance control method which control an own vehicle on the basis of the following distance between the own vehicle and a preceding vehicle.

2. Description of Related Art

Examples of a following distance control device that controls an own vehicle on the basis of the following distance between the own vehicle and a preceding vehicle include one described in Japanese Patent Application Publication No. 2001-225669 (JP-A-2001-225669). According to this following distance control device, the following distance between the preceding vehicle and the own vehicle is measured by a forward looking sensor such as a laser radar or a millimeter-wave radar, and a following time obtained by dividing the following distance by the vehicle speed of the own vehicle is controlled so as to be a target time or more, thereby keeping the following distance between the preceding vehicle and the own vehicle at a target following distance or more. In a case where a following distance control is performed across all vehicle speeds in such a following distance control device, when the own vehicle is traveling at a predetermined speed or less, in conditions such as congestion and the preceding vehicle stops, a control is performed to bring the own vehicle to a stop in order to keep the following distance.

However, such a following distance control device uses the wheel speed measured by a wheel speed sensor to find the vehicle speed of the own vehicle. Since this wheel speed sensor cannot detect a wheel speed in an extremely low speed range, for example, 1 km/h or less, in that extremely low speed range, the wheel speed and hence the vehicle speed become zero even when the own vehicle has not stopped.

Therefore, the determination as to whether the own vehicle is at a stop is made on the basis of the time elapsed after the wheel speed becomes zero, and the base requested acceleration for the own vehicle is continued to be computed on the basis of the following distance between the preceding vehicle and the own vehicle even during the period of this elapsed time. If the preceding vehicle accelerates at this time, the following distance increases, and so does the relative speed between the preceding vehicle and the own vehicle. Accordingly, the base requested acceleration also increases, causing the own vehicle to accelerate.

If, thereafter, the determination of the stop of the own vehicle is made, and the minimum value of the requested acceleration for stopping is computed and a stop-holding brake is applied to the own vehicle, this means that the stop-holding brake is applied after the own vehicle accelerates and thus a sudden brake is applied during acceleration, which produces an unpleasant shock on the own vehicle and makes a smooth stop impossible.

SUMMARY OF THE INVENTION

The present invention provides a following distance control device and a following distance control method which make it possible to bring an own vehicle to a stop more smoothly.

A following distance control device according to a first aspect of the present invention includes: a vehicle speed detecting device that detects a vehicle speed of an own vehicle, and outputs a vehicle speed equal to or less than a predetermined speed as zero; a following distance detecting device that detects a following distance between a preceding vehicle and the own vehicle; a first requested acceleration computing device that computes a requested acceleration from vehicle information including at least the following distance; a control device that controls the following distance to the preceding vehicle on the basis of the requested acceleration, and performs a stop control as the preceding vehicle stops; and a stop determining device that determines a stop of the own vehicle on the basis of a first requested acceleration at a first time point when an output value of the vehicle speed detecting device becomes zero.

In this connection, the following distance control device may further include a second requested acceleration computing device that computes a requested acceleration for stopping, which is a requested acceleration at the time of stopping the own vehicle, when the stop of the own vehicle is determined.

Further, in the following distance control device, the control device may control the own vehicle on the basis of the first requested acceleration and the requested acceleration for stopping.

It should be noted that the vehicle speed detecting device detects as a vehicle speed the mean of the wheel speeds detected by wheel speed sensors provided to the left and right rear wheels, for example, of wheel speed sensors provided to the respective wheels of the own vehicle. Generally, in an extremely low speed range in which the real vehicle speed of the own vehicle is, for example, 1 km/h or less, the wheel speed sensors detect the wheel speed as zero, so the vehicle speed detected by the vehicle speed detecting device also becomes zero. That is, in this case, the real vehicle speed at the first time point when the output value of the vehicle speed detecting device becomes zero is 1 km/h.

In this connection, the stop determining device may determine the stop of the own vehicle at a second time point when a time obtained by dividing a real vehicle speed at the first time point by the first requested acceleration has elapsed since the first time point.

Therefore, even in an extremely low speed range in which the vehicle speed detecting device detects the vehicle speed as zero, the determination of the stop of the own vehicle is made at the second time point when a time obtained by dividing the real vehicle speed at the first time point by the first requested acceleration has elapsed since the first time point, thereby making it possible to accurately determine the stop of the own vehicle.

That is, since the determination of the stop of the own vehicle can be made accurately, it is possible to prevent a situation where a stop-holding brake is actuated before the own vehicle comes to a full stop, producing a shock on the vehicle.

In addition, it is also possible to prevent a situation where, before the stop determining device determines the stop of the own vehicle, the preceding vehicle accelerates again, and accordingly the requested acceleration increases to cause the stop-holding brake to be actuated at that point, producing a shock on the own vehicle.

Therefore, the own vehicle can be brought to a stop more smoothly. It should be noted that the stop-holding brake refers to a brake for preventing the own vehicle from moving due to the slope of a hill or the like or other such factors after the own vehicle is brought to a stop, thereby securely holding the own vehicle at a stop.

Further, the first requested acceleration computing device may hold the requested acceleration at the first requested acceleration from the first time point to the second time point.

Therefore, the own vehicle can be securely brought to a stop at the time point when the stop determining device determines the stop of the own vehicle.

In addition, at the time point when the stop determining device determines the stop, the first requested acceleration computing device may fix the requested acceleration to zero.

Therefore, it is possible to prevent a situation where, before the stop determining device determines the stop of the own vehicle, the preceding vehicle accelerates again and the requested acceleration increases accordingly.

Further, at the time point when the stop determining device determines the stop, the second requested acceleration computing device may fix the requested acceleration for stopping to a predetermined minimum value.

Therefore, the stop-holding brake can be actuated on the basis of the determination of the stop of the own vehicle by the stop determining device. This makes it possible to prevent a situation where the stop-holding brake is actuated before the own vehicle comes to a full stop, producing a shock on the own vehicle.

In addition, it is also possible to prevent a situation where, before the stop determining device determines the stop of the own vehicle, the preceding vehicle accelerates again, and accordingly the requested acceleration increases and the stop-holding brake is actuated at that point, producing a shock on the own vehicle.

A following distance control method according to a second aspect of the present invention includes: detecting a vehicle speed of the own vehicle by using a vehicle speed detecting device that determines predetermined speed or less as zero and outputs this signal; detecting a following distance between a preceding vehicle and the own vehicle; computing a requested acceleration from vehicle information including at least the following distance; controlling the following distance to the preceding vehicle on the basis of the requested acceleration, and performing a stop control when the preceding vehicle stops; and determining a stop of the own vehicle on the basis of a first requested acceleration at a first time point when an output value of the vehicle speed detecting device becomes zero.

According to the aspects of the present invention, it is possible to provide a following distance control device and a following distance control method which can smoothly bring an own vehicle to a stop.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Hereinbelow, the present invention will be described with reference to the accompanying drawings.

Figure 1:
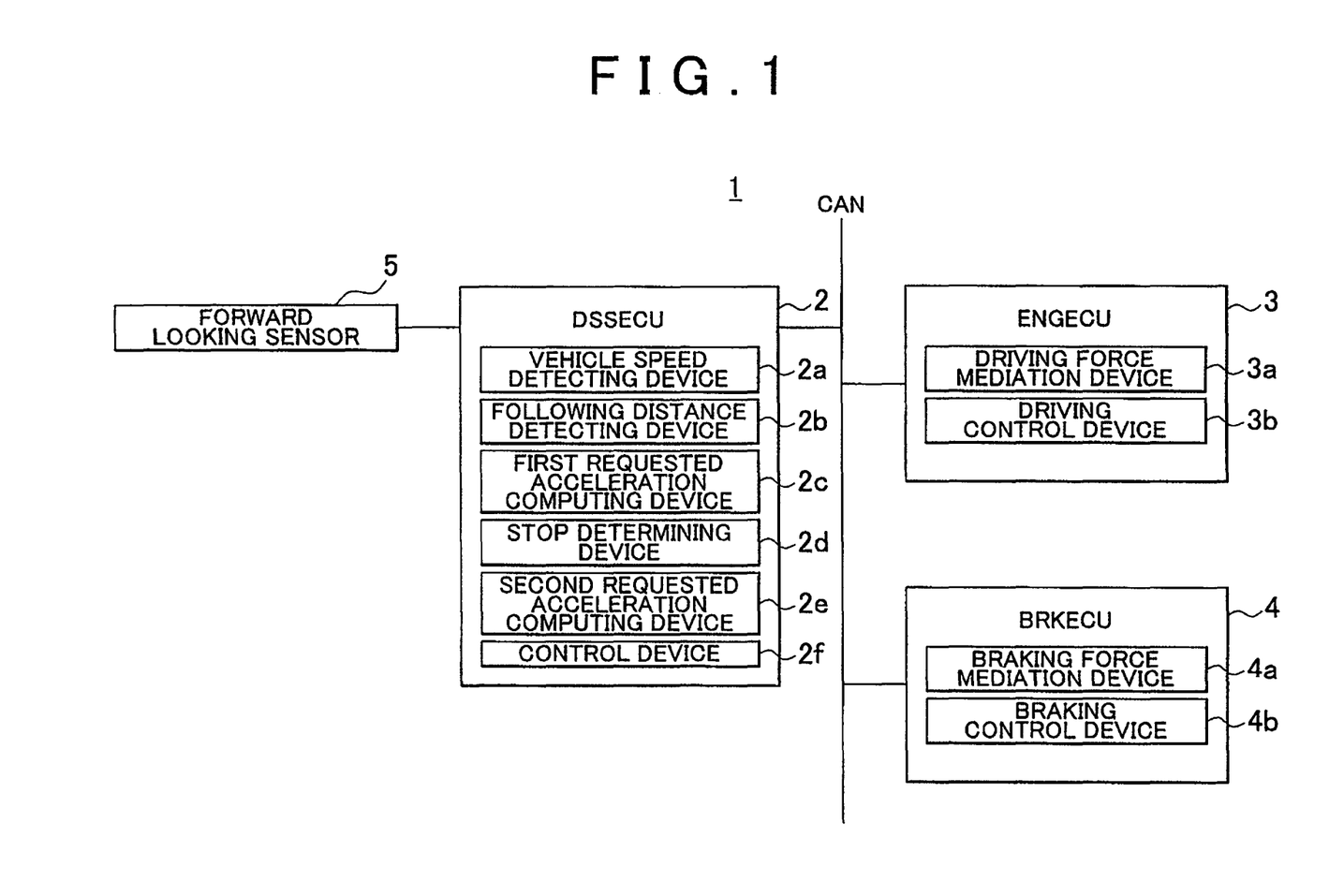
FIG. 1 is a block diagram showing a following distance control device according to an embodiment of the present invention.

FIG. 1 is a block diagram showing a following distance control device according to an embodiment of the present invention.

A following distance control device 1 includes a DSSECU 2 (Driver Support System Electronic Control Unit), ENGECU 3 (Engine Electronic Control Unit), a BRKECU 4 (Brake Electronic Control Unit), and a forward looking sensor 5. The DSSECU 2, the ENGECU 3, and the BRKECU 4 are connected to each other via a communications protocol such as CAN (Controller Area Network).

The forward looking sensor 5 is, for example, a laser radar or a millimeter-wave radar, and measures the following distance between an own vehicle and a preceding vehicle located in front of the own vehicle and outputs the measurement results to the DSSECU 2. The forward looking sensor 5 is provided to the front grill or front bumper (not shown) of the own vehicle.

The DSSECU 2 is configured by, for example, a CPU, a ROM, and a RAM, and a data bus connecting between these components, with the CPU carrying out predetermined processing in accordance with a program stored in the ROM. The DSSECU 2 includes a vehicle speed detecting device 2a, a following distance detecting device 2b, a first requested acceleration computing device 2c, a stop determining device 2d, a second requested acceleration computing device 2e, and a control device 2f.

The vehicle speed detecting device 2a of the DSSECU 2 acquires wheel speeds from vehicle speed sensors for left and right rear wheels of the own vehicle (not shown), and computes the mean of these wheel speeds to detect the vehicle speed. The following distance detecting device 2b of the DSSECU 2 detects the following distance by means of the forward looking sensor 5, and computes a relative speed Vr by differentiating this following distance or directly detects the relative speed Vr.

The first requested acceleration computing device 2c of the DSSECU 2 computes a requested acceleration GBASE from a comparison between the following distance detected by the following distance detecting device 2b and a target following distance, and the relative speed Vr. The stop determining device 2d of the DSSECU 2 determines the stop of the own vehicle on the basis of a requested acceleration Greq_pre_0 kph at the time point when the vehicle speed detected by the vehicle speed detecting device 2a becomes zero.

That is, the stop determining device 2d determines the stop of the own vehicle at the time point when a time TSTOP has elapsed since the time point when the vehicle speed VSPD detected by the vehicle speed detecting device 2a becomes zero. The time TSTOP is obtained by dividing the real vehicle speed Vpre_0 kph at the time point when the detected vehicle speed VSPD becomes zero (if the wheel speed sensor detects a wheel speed of 1 km/h or less as zero, Vpre_0 kph=1 km/h) by the base requested acceleration Greq_pre_0 kph at the time point when the detected vehicle speed VSPD has become zero.

The second requested acceleration computing device 2e of the DSSECU 2 computes a requested acceleration for stopping GSTOP on the basis of the stop determination made by the stop determining device 2d. That is, prior to the time point when the detected vehicle speed VSPD becomes zero, the second requested acceleration computing device 2e sets the requested acceleration for stopping GSTOP to the maximum value, for example, 1.67 m/s². After the time point when the detected vehicle speed VSPD has become zero until the time point when the stop determination is made, the second requested acceleration computing device 2e sets the requested acceleration for stopping GSTOP to Greq_pre_0 kph that is the requested acceleration at the time point when the vehicle speed VSPD becomes zero. After the time point when the stop determination is made, the second requested acceleration computing device 2e fixes the requested acceleration for stopping GSTOP to the minimum value, for example, −2.45 m/s².

It should be noted that the reason why the requested acceleration for stopping GSTOP is set to Greq_pre_0 kph that is the requested acceleration at the time point when the vehicle speed VSPD becomes zero is to prevent the requested acceleration for stopping GSTOP from interfering with the requested acceleration GBASE when performing a deceleration control at the time point when the detected vehicle speed VSPD has become zero by setting the requested acceleration GBASE to Greq_pre_0 kph that is the requested acceleration at the time point when the detected vehicle speed VSPD becomes zero, because the control device 2f of the DSSECU 2 computes a requested acceleration Gx by selecting the smaller of the requested acceleration GBASE and the requested acceleration for stopping GSTOP, that is, by making a minimum selection.

Further, at the time point when the detected vehicle speed VSPD becomes zero, the requested acceleration for stopping GSTOP is set to Greq_pre_0 kph which is the requested acceleration at the time point when the detected vehicle speed VSPD becomes zero. Thus, as a pre-step before setting the requested acceleration for stopping GSTOP to the minimum value at the time point when the stop determining device 2d has determined the stop of the own vehicle, the requested acceleration for stopping GSTOP can be temporarily held at a value smaller than the maximum value. Hence, it is possible to shorten the time required for the second requested acceleration computing device 2e to bring the requested acceleration for stopping GSTOP to the minimum value while placing a limit on the rate of change.

Likewise, the reason why the requested acceleration for stopping GSTOP is fixed at the maximum value prior to the time point when the vehicle speed VSPD becomes zero is to prevent the requested acceleration for stopping GSTOP for actuating the stop-holding brake from interfering with the base requested acceleration GBASE, because the control device 2f of the DSSECU 2 computes the requested acceleration Gx by selecting the smaller of the base requested acceleration GBASE and the requested acceleration for stopping GSTOP, that is, by making a minimum selection.

Further, the control device 2f of the DSSECU 2 controls the own vehicle on the basis of the requested acceleration GBASE, and the requested acceleration for stopping GSTOP. Specifically, as described above, the control device 2f computes the requested acceleration Gx by selecting the smaller of the requested acceleration GBASE and the requested acceleration for stopping GSTOP, that is, by making a minimum selection, computes a requested driving force Fx on the basis of the requested acceleration Gx, and outputs the requested driving force Fx as a command value to the ENGECU 3 and the BRKECU 4.

The ENGECU 3 is also configured by, for example, a CPU, a ROM, and a RAM, and a data bus connecting between these components, with the CPU carrying out predetermined processing in accordance with a program stored in the ROM. The ENGECU 3 includes a driving force mediation device 3a, and a driving control device 3d. The driving force mediation device 3a mediates the requested driving force Fx acquired from the DSSECU 2, and a driver request inputted by the driver depressing an accelerator pedal (not shown). From the requested driving force Fx or the driver request mediated by the driving force mediation device 3a, the driving control device 3b computes a driving force to be generated by a driving device formed by an engine and a transmission (not shown), and outputs the computed driving force to the driving device as a command.

The BRKECU 4 is also configured by, for example, a CPU, a ROM, and a RAM, and a data bus connecting between these components, with the CPU carrying out predetermined processing in accordance with a program stored in the ROM. The BRKECU 4 includes a braking force mediation device 4a, and a braking control device 4b. The braking force mediation device 4a mediates the requested driving force Fx acquired from the DSSECU 2, and a driver request inputted by the driver depressing a brake pedal (not shown). From the requested braking force Fx or the driver request mediated by the braking force mediation device 4a, the driving control device 4b computes a braking force to be generated by a braking device formed by a caliper brake (not shown), and outputs the computed braking force to the braking device as a command.

The following distance control device 1 according to this embodiment described above has a so-called driving force demand control structure, and can control the ENGECU 3 and the BRKECU 4 on the basis of a single parameter by using the requested driving force Fx applied to the vehicle. This eliminates the need to select either one of the ENGECU 3 and the BRKECU 4 by the DSSECU 2, thus making it possible to simplify the control system. Further, because the control is performed on the basis of the requested driving force Fx that is a factor determining a physical quantity such as the acceleration of the vehicle, the above-mentioned configuration proves advantageous in enhancing the accuracy of a simulation or the like.

Figure 2:
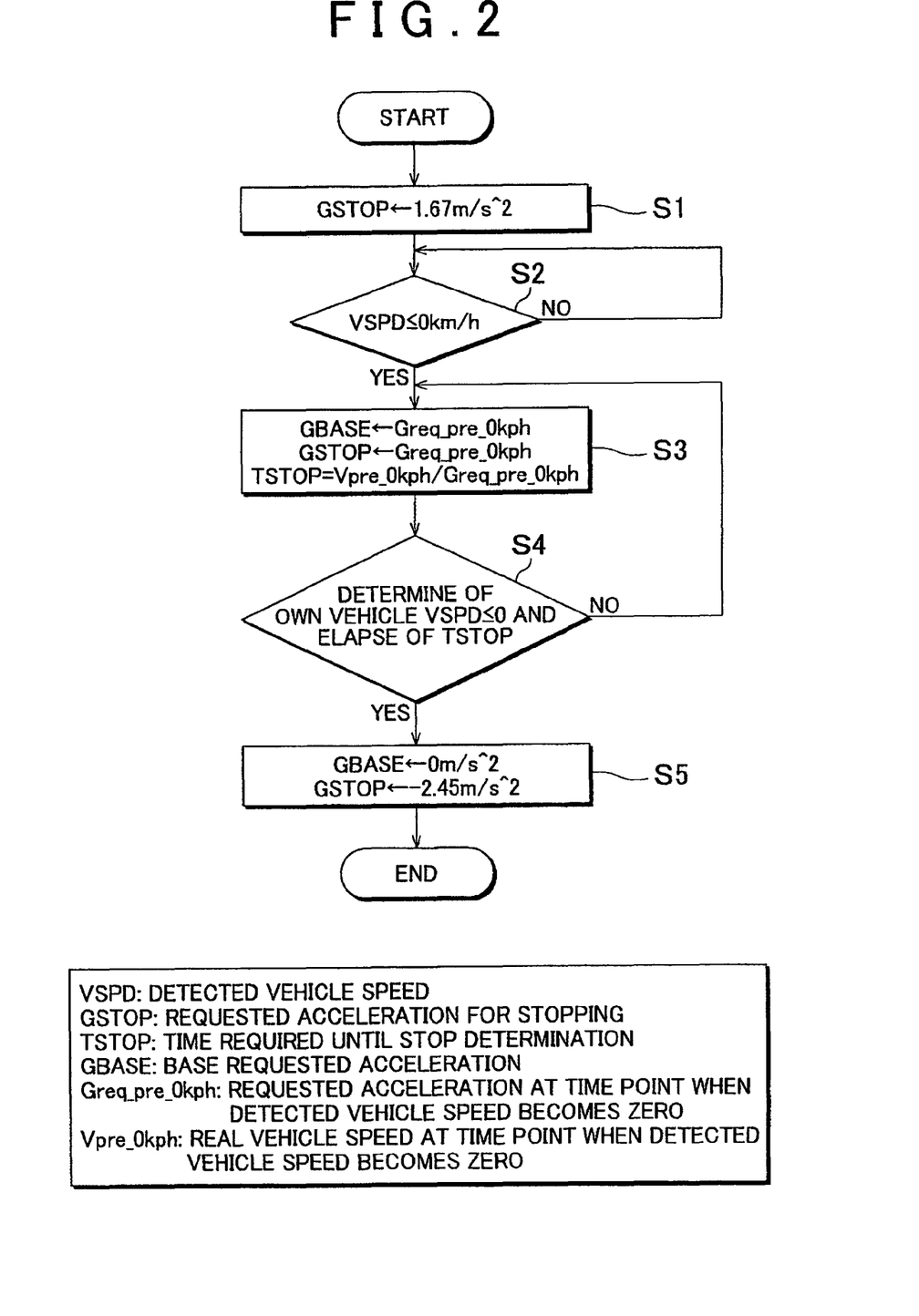
FIG. 2 is a flow chart showing the contents of a control performed by a following distance control device according to an embodiment of the present invention.
Figure 3:
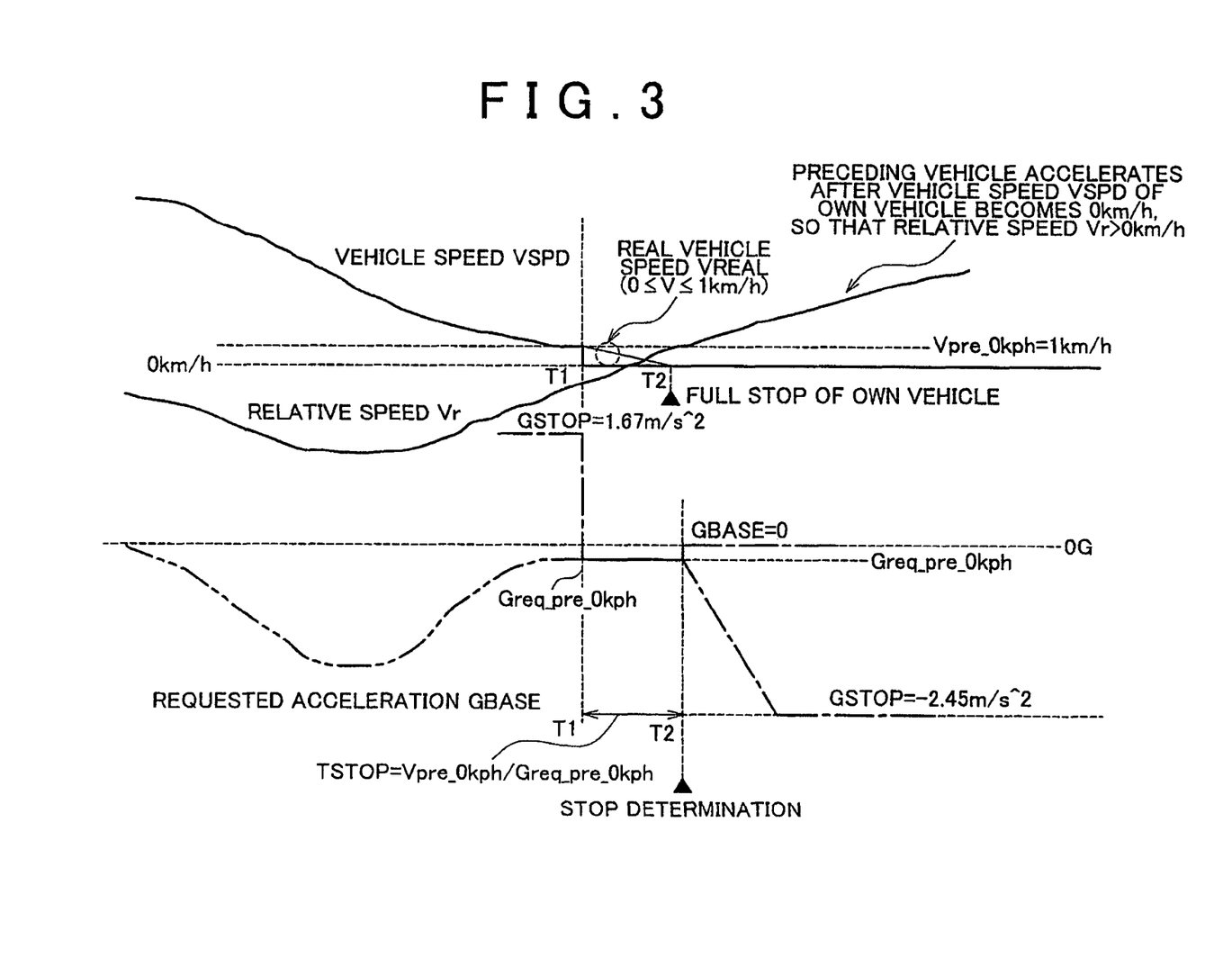
FIG. 3 is a time chart showing the results of a control performed by a following distance control device according to an embodiment of the present invention.
Figure 4:
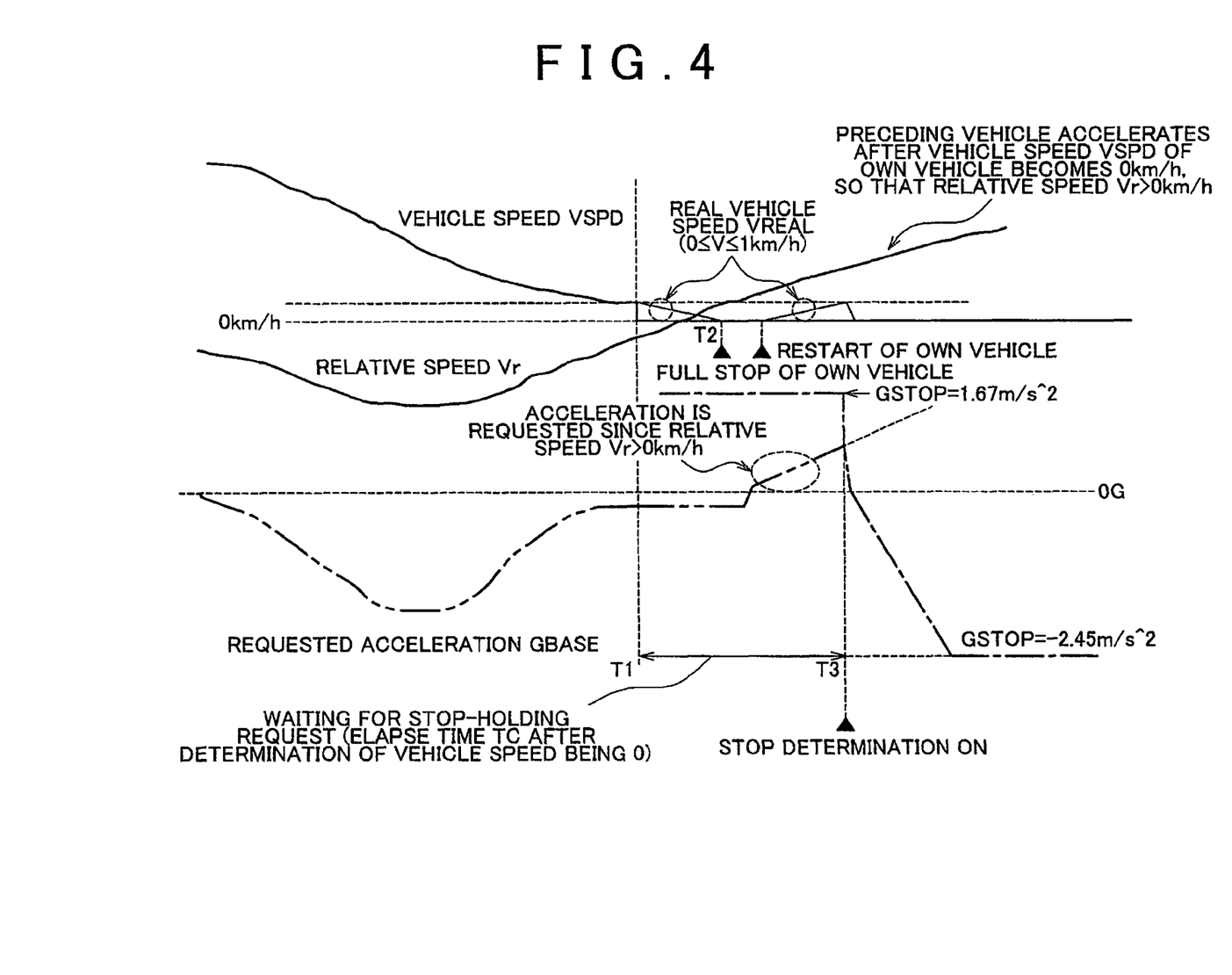
FIG. 4 is a time chart showing the results of a control performed by a following distance control device according to an embodiment of the related art.

Hereinbelow, the contents of a control performed by the following distance control device 1 according to this embodiment will be described with reference to a flow chart and a time chart. FIG. 2 is a flow chart showing the contents of a control performed by the following distance control device 1 according to the present invention, and FIG. 3 is a time chart showing the results of the control performed by the following distance control device 1 according to the present invention. FIG. 4 is a time chart showing the results of a control performed by the following distance control device according to the related art.

In the time chart shown in FIG. 3, the vehicle speed VSPD detected by the vehicle speed detecting device 2a of the DSSECU 2 decreases as the preceding vehicle decelerates. The relative speed Vr temporarily decreases as the preceding vehicle decelerates, and then increases again as the preceding vehicle accelerates again. The requested acceleration GBASE temporarily decreases so as to decelerate the own vehicle, and then increases again immediately before stopping while keeping a negative value.

Then, at a time point T1 when the real vehicle speed VREAL becomes equal to 1 km/h, the detected vehicle speed VSPD becomes 0 km/h. Thereafter, until a time point T2 when the own vehicle comes to a full stop, the detected vehicle speed VSPD is kept at 0 km/h as it is, and the real vehicle speed VREAL gradually decreases from 1 km/h to 0 km/h.

In S1 of the flow chart in FIG. 2, prior to the time point T1 in the time chart shown in FIG. 3, the second requested acceleration computing device 2e of the DSSECU 2 fixes the requested acceleration for stopping GSTOP at the maximum value of 1.67 m/s$^2$.

Next, in S2, the stop determining device 2d of the DSSECU 2 determines whether or not the vehicle speed VSPD detected by the vehicle speed detecting device 2a of the DSSECU 2 becomes 0 km/h. If it is determined that this condition is met, the process advances to S3, and if it is determined that this condition is not met, the process returns to S2 and this determination is repeated.

In S3, the first requested acceleration computing device 2c of the DSSECU 2 fixes the requested acceleration GBASE to Greq_pre_0 kph. The second requested acceleration computing device 2e of the DSSECU 2 also fixes the requested acceleration for stopping GSTOP at Greq_pre_0 kph.

In addition, in S3, the stop determining device 2d of the DSSECU 2 computes a stop determination time TSTOP by dividing the real vehicle speed Vpre_0 kph at the time point T1 when the detected vehicle speed VSPD has become zero (1 km/h if the wheel speed sensor cannot detect a wheel speed of 1 km/h or less) by the base requested acceleration Greq_pre_0 kph. Then, the process advances to S4.

In S4, the stop determining device 2d of the ESSECU 2 determines whether or not the stop determination time TSTOP computed in S3 elapses since the time point T1 when the detected vehicle speed VSPD becomes 0 km/h, and the time point T2 in the time chart shown in FIG. 3 is reached. If it is determined that this condition is met, the process advances to S5, and if it is determined that this condition is not met, the process returns to S3.

In S5, because it is determined in step S4 that the own vehicle is stopped, at the time point T2 shown in FIG. 3, the first requested acceleration computing device 2c fixes the requested acceleration GBASE to 0 m/s$^2$, and the second requested acceleration computing device 2e fixes the requested acceleration for stopping GSTOP to the minimum value of −2.45 m/s$^2$.

FIG. 4 is a time chart showing the contents of a control performed by a following distance control device of the related art not according to this embodiment. In the control according to the related art, the detected vehicle speed VSPD decreases as the preceding vehicle decelerates. The relative speed Vr temporarily decreases as the preceding vehicle decelerates, and then increases again as the preceding vehicle accelerates again. The requested acceleration GBASE temporarily decreases so as to decelerate the own vehicle, and then increases again immediately before stopping while keeping a negative value.

Then, at the time point T1 when the real vehicle speed VREAL becomes Vpre_0 kph=1 km/h, the detected vehicle speed VSPD becomes 0 km/h. Thereafter, until the time point T2 when the own vehicle comes to a full stop, the detected vehicle speed VSPD is kept at 0 km/h as it is, and the real vehicle speed VREAL gradually decreases from 1 km/h to 0 km/h.

However, according to the related art, a stop determination is not made until the time point T3 when a predetermined elapse time TC has elapsed since the time point T1 when the detected vehicle speed VSPD of the own vehicle becomes 0 km/h. The predetermined elapse time TC must be set with some margin of safety to prevent a stop-holding brake from being actuated before the own vehicle comes to a full stop. Thus, the time point T3 becomes later than the time point T2.

Accordingly, if the preceding vehicle accelerates again before the time point T3 and the relative speed Vr increases, the requested acceleration GBASE also increases, and the own vehicle accelerates again on the basis of this increased requested acceleration, so the real vehicle speed VREAL increases. It should be noted that in either of FIGS. 3 and 4, when switching the requested acceleration for stopping GSTOP from the maximum value to the minimum value in actuating the stop-holding brake, a limit is imposed on the rate of change for the purpose of shock prevention.

Under this situation, when, at time point T3, the requested acceleration for stopping GSTOP is fixed to the minimum value of −2.45 m/s$^2$, and the stop-holding brake is actuated, this means that the brake is actuated after acceleration is made again, causing an unpleasant shock to be applied to the own vehicle. The following distance control device 1 according to this embodiment resolves this problem as follows.

That is, the following distance control device 1 according to this embodiment as realized by the control described above can overcome the above-described problem and provide operational effects described below. That is, even in an extremely low speed range with the real vehicle speed VREAL being 1 km/h or below in which the vehicle speed VSPD detected by the vehicle speed detecting device 2a becomes zero, the determination of the stop of the own vehicle is made at the time point T2 when the stop determination time TSTOP, which is obtained by dividing the real vehicle speed Vpre_0 kph (1 km/h) at the time point T1 by the requested acceleration Greq_pre_0 kph at the time point T1, has elapsed since the time point T1 when the detected vehicle speed VSPD becomes zero. It is thus possible to accurately determine the stop of the own vehicle.

That is, because the stop of the own vehicle can be accurately determined, the requested acceleration for stopping GSTOP may simply be set to the minimum value to actuate the stop-holding brake at the time point T2 when the stop of the own vehicle is determined. Thus, it is possible to prevent a situation where, as shown in FIG. 4, the preceding vehicle accelerates again before the time point T3 when the stop of the own vehicle is determined by the stop determining device 2d, the requested acceleration GBASE increases accordingly and the own vehicle accelerates again, and the stop-holding brake is actuated with the requested acceleration for stopping GSTOP set to the minimum value at the time point T3, producing a shock on the own vehicle. Therefore, the following distance control device 1 according to this embodiment makes it possible to bring the own vehicle to a stop more smoothly.

In addition, because the determination of the stop of the own vehicle can be made accurately, it is also possible to prevent a situation where, before the time point T2 when the own vehicle comes to a full stop, the second requested acceleration computing device 2e sets the requested acceleration for stopping GSTOP to the minimum value to actuate the stop-holding brake, producing a shock on the own vehicle.

Further, after the time point T1 when the detected vehicle speed VSPD becomes zero until the time point T2 when the own vehicle comes to a full stop, the first requested acceleration computing device 2c holds the requested acceleration GBASE at Greq_pre_0 kph that is the requested acceleration at the time point T1. Thus, the own vehicle can be securely brought to a stop at the time point T2 when the stop determining device 2d determines that the own vehicle stops.

In addition, at the time point T2 when the stop determining device 2d determines the stop, the requested acceleration computing device 2c fixes the base requested acceleration GBASE to zero. Thus, it is possible to prevent a situation where, before the time point T2 when the stop determining device 2d determines the stop of the own vehicle, the preceding vehicle accelerates again, and accordingly the requested acceleration GBASE increases so the own vehicle accelerates again.

Further, at the time point T2 when the stop determining device 2d determines the stop, the second requested acceleration computing device 2e fixes the requested acceleration for stopping GSTOP to the minimum value. Thus, on the basis of the determination of the stop of the own vehicle by the stop determining device 2d, the requested acceleration for stopping GSTOP can be fixed to the minimum value to actuate the stop-holding brake. This makes it possible to actuate the stop-holding brake before the own vehicle comes to a full stop, thereby preventing a shock from being produced on the vehicle.

In addition, it is also possible to prevent a situation where the preceding vehicle accelerates again before the time point T2 when the stop determining device 2d determines the stop of the own vehicle, and accordingly the requested acceleration GBASE increases and the stop-holding brake is actuated at that point, producing a shock on the own vehicle.

While a preferred embodiment of the present invention has been described above in detail, the present invention is not limited to the above-described embodiment, and various modifications and substitutions can be made to the above-described embodiment without departing from the scope of the present invention.

For example, while in the above-described embodiment the real vehicle speed Vpre_0 kph at the time point when the vehicle speed VSDP detected by the vehicle speed detecting device 2a of the DSSECU 2 becomes zero is set as 1 km/h, this is merely an illustrative example and varies depending on the specifications of the wheel speed sensor. The real vehicle speed Vpre_0 kph may take other values, for example, 0.8 km/h, as long as it is in the vicinity of 0 km/h.

The present invention relates to a following distance control device and a following distance control method which control an own vehicle on the basis of the following distance between a preceding vehicle and the own vehicle, and makes it possible to smoothly bring the own vehicle to a stop. Thus, the present invention will prove useful for application to various types of vehicle such as passenger cars, tracks, and buses.

The invention claimed is:

1. A following distance control device comprising:
a vehicle speed detecting device that detects a vehicle speed of an own vehicle, and outputs a vehicle speed equal to or less than a predetermined speed as zero;
a following distance detecting device that detects a following distance between a preceding vehicle and the own vehicle;
a first requested acceleration computing device that computes a requested acceleration from vehicle information including at least the following distance;
a control device that controls the following distance to the preceding vehicle on the basis of the requested acceleration, and performs a stop control as the preceding vehicle stops; and
a stop determining device that determines a stop of the own vehicle on the basis of a first requested acceleration at a first time point when an output value of the vehicle speed detecting device becomes zero,
wherein the stop of the own vehicle is determined at a second time point when a time obtained by dividing a real vehicle speed at the first time point by the first requested acceleration has elapsed since the first time point.

2. The following distance control device according to claim 1, further comprising:
a second requested acceleration computing device that computes a requested acceleration for stopping, which is a requested acceleration at the time of stopping the own vehicle, when the stop of the own vehicle is determined.

3. The following distance control device according to claim 2, wherein
the control device controls the own vehicle on the basis of the first requested acceleration and the requested acceleration for stopping.

4. The following distance control device according to claim 3, wherein
the control device controls the own vehicle on the basis of the smaller of the first requested acceleration and the requested acceleration at the time of stopping.

5. The following distance control device according to claim 1, wherein
the first requested acceleration computing device holds the requested acceleration at the first requested acceleration from the first time point to the second time point.

6. The following distance control device according to claim 1, wherein
at the second time point, the first requested acceleration computing device fixes the requested acceleration to zero.

7. The following distance control device according to claim 1, wherein
at the second time point, the second requested acceleration computing device fixes the requested acceleration for stopping to a predetermined minimum value.

8. The following distance control device according to claim 1, wherein
the real vehicle speed is the predetermined speed at or below which the vehicle speed detecting device outputs zero.

9. A following distance control method comprising:
detecting a vehicle speed of an own vehicle by using a vehicle speed detecting device that outputs a vehicle speed equal to or less than a predetermined speed as zero;
detecting a following distance between a preceding vehicle and the own vehicle;
computing a requested acceleration from vehicle information including at least the following distance;
controlling the following distance to the preceding vehicle on the basis of the requested acceleration, and performing a stop control when the preceding vehicle stops;
determining a stop of the own vehicle on the basis of a first requested acceleration at a first time point when an output value of the vehicle speed detecting device becomes zero;
determining the stop of the own vehicle when a time obtained by dividing a real vehicle speed at the first time point by the first requested acceleration has elapsed since the first time point.

* * * * *